June 27, 1967

R. S. WEBB 3,328,635

ELECTRICAL DISCHARGE MACHINING POWER SUPPLY

Original Filed May 16, 1960

INVENTOR.
Robert S. Webb.
BY
Harry R Dumont
ATTORNEY.

United States Patent Office 3,328,635
Patented June 27, 1967

3,328,635
ELECTRICAL DISCHARGE MACHINING
POWER SUPPLY
Robert S. Webb, Bloomfield Hills, Mich., assignor to Elox Corporation of Michigan, Troy, Mich., a corporation of Michigan
Original application May 16, 1960, Ser. No. 29,363, now Patent No. 3,229,159, dated Jan. 11, 1966. Divided and this application Jan. 13, 1965, Ser. No. 425,163
4 Claims. (Cl. 315—200)

This application is a division of my copending application Ser. No. 29,363, filed May 16, 1960, entitled, "Superimposed High Striking Voltage Circuit."

This invention relates to improvements in methods and apparatus for electrical-discharge-machining, sometimes referred to as "EDM," "arc-machining," or "spark-machining."

During recent years, the electrical-discharge-machining process has been used increasingly in the forming of cavities in very hard materials such as tool steels, cemented carbides, and the like. Improvements have been made in rate of machining, accuracy and finish, and in practically all of the modern EDM apparatus now in use, electron tubes are utilized to obtain the rapid interruption of the power circuit that is required for rapid stock removal with good surface finish.

Electron tubes commercially obtainable are severely limited in their power carrying capacity. These devices are high-voltage, low-current devices. The machining gap in EDM apparatus, on the other hand, has a voltage drop of only about 15 volts. The present method of achieving high machining rate is to pass as high as possible current through the gap which necessitates paralleling tubes in banks, sometimes hundreds in number.

For example, in one EDM machine currently in use, a bank of 150 type 6AS7 vacuum tubes connected in parallel comprise the power supply to the machining gap. A 115 volt input supply is connected to the machine and the circuit interruption characteristic is such that power pulses are delivered to the gap approximately one-third of the time. The peak current is about 150 amperes and the average current about 50 amperes, the voltage drop through the power circuit being about 100 volts. It is known, however, that 6AS7 tubes and some other types are capable of interrupting circuits with voltages much higher than 115 volts.

Accordingly, it is an object of my invention to provide an improved EDM circuit wherein much higher currents are delivered to the machining gap with the same number of switching devices.

Another object is to increase the overall power efficiency by a very substantial amount and to make possible utilization of the full voltage carrying characteristics of the switching devices.

The principal object is to provide in apparatus of the aforesaid type, means for superimposing on the machining voltage pulses a voltage pulse of much higher magnitude thereby providing increased overcut where a particular increase in gap size is desired, and improved power feed stability due to the larger gap clearance.

A still further object is to provide a machining circuit utilizing transistors instead of electron tubes which incorporates the above advantages.

Other objects and advantages will become apparent from the following specification which, taken in conjunction with the accompanying drawings, discloses preferred forms of my device.

In the drawings:

FIG. 9 is a modified circuit designed to operate at high current but low frequency and useful principally for roughing purposes;

It will be understood that in the apparatus about to be described, automatic servo power feed of the machining electrode is contemplated, in accordance with present day practice in the EDM art. The details of such a power feed have been omitted in the interest of brevity, and reference is made to my copending applications, Ser. No. 805,989, filed Apr. 13, 1959, and Ser. No. 15,505, filed Mar. 16, 1960, for examples of power feeds suitable for use with the apparatus herein described.

Figure 1:
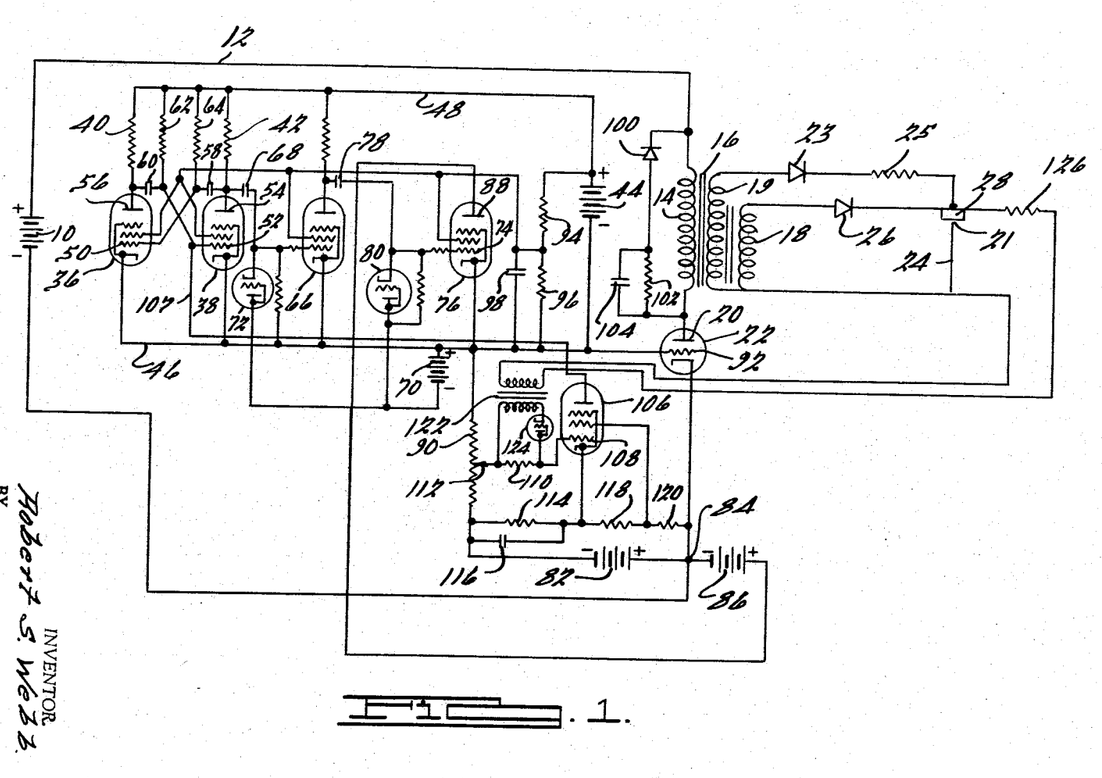
FIG. 1 is a schematic wiring diagram of a typical EDM power supply constructed in accordance with my invention.

Referring to FIG. 1, it will be seen that I have shown at 10 the main power supply for the apparatus, which comprises a 300 volt, DC supply, this voltage being about maximum for the plate supply of the 6AS7 power tubes. A lead 12 from the positive side of the power supply connects to one side of primary 14 of the power transformer 16. The latter has a secondary 18 and is of the iron-core type, although an air-core transformer may be used for more delicate machining, particularly finishing operations.

An additional secondary winding 19 of relatively low power, high voltage characteristic is connected in parallel with the machining gap 21 through a rectifier 23 and a resistor 25.

It is, of course, understood that the gap 21 is supplied with suitable coolant in accordance with standard EDM practice.

The other side of primary 14 is connected to the anode 20 of a power tube 22. It will be understood that the tube 22 represents a bank of tubes (in this instance 6AS7's) connected in parallel. Almost any number of such tubes may be so connected to provide the required power flow through the gap.

The secondary 18 of the power transformer 16 is connected at one side to the electrode 24, and at the other side to a workpiece 28 through a blocking diode 26.

The power tube bank 22 is controlled by a multivibrator network which comprises tubes 36 and 38. These tubes are preferably pentodes, type 6DQ5. The plates or anodes of these tubes are connected through load resistors 40, 42, and lead 48 to the positive terminal of a suitable power supply 44, the negative terminal of which is connected with the cathodes of the tubes by lead 46. The power supply 44 may be separate or it may be derived from the main supply 10 as desired.

The control grids 50, 52, of the tubes 36, 38, are cross-connected to the anodes 54, 56, respectively through coupling condensers 58, 60, and are connected to the positive side of the multivibrator power supply through the grid resistors 62, 64.

The output signal from multivibrator tubes 36, 38, is fed into an amplifier, which may comprise one or more pentode tubes 66, through condenser 68 and clamped to negative bias voltage 70 through diode 72. The amplified and resquared signal from tube 66 is fed to the grid 74 of pentode 76 (which may be one of a bank) where it is again amplified before being fed to the power tube bank 22. The coupling to the "driver" tube 76 is through a coupling condenser 78 and a clamping diode 80 is provided to insure positive cut-off characteristic. Suitable isolation and signal resistors are also provided as shown to control the operating characteristics of diodes 72 and 80.

The power required to drive the main power tube bank 22 is in the order of several hundred watts, and to obtain increased efficiency, the amplifier 76 is floated in the grid circuit of the bank 22 rather than connected to the negative terminal of bias supply 82 as would be expected. Since the control signal appears between the cathode of driver 76 and point 84 of the circuit which is grounded, the network just described, which comprises a multivibrator and two stages of amplification, may be thought of a floating signal source.

The output signal from this network is of rectangular wave form and is of substantially greater magnitude than that obtained from the conventional square wave generator. Normally these signal generators have an output of approximately ten watts. In the EDM circuit of FIG. 1, the power required to drive the grids of the tube bank 22 is in the order of two hundred watts and more. A booster power supply 86 is preferably provided in series with the bias supply 82 to provide adequate voltage for the plate 88 of driver 76.

Figures 2, 3, 4, 5, 6, 7:
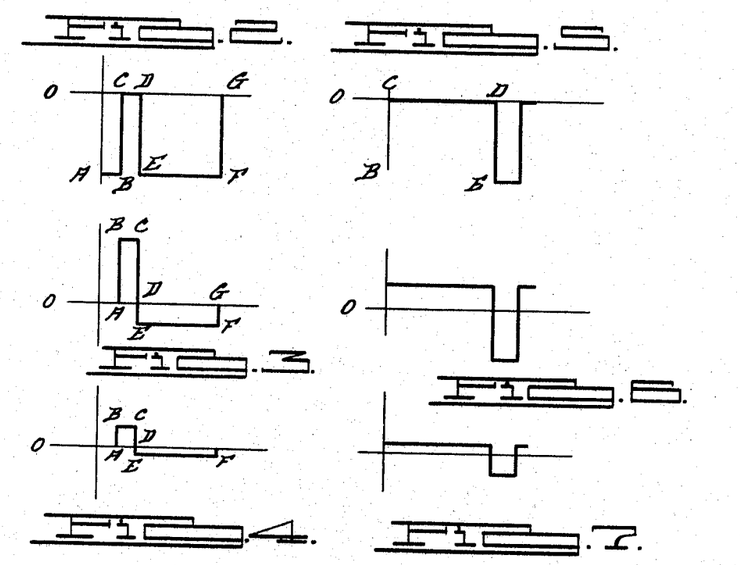
FIG. 2 is a graphical representation of the grid drive voltage of the power tube bank in the above power supply.
FIG. 3 is a similar representation of the voltage in the primary of the power transformer.
FIG. 4 represents the voltage in the secondary 18 of the power transformer.
FIGS. 5, 6 and 7 are similar representations of a similar set of conditions, but showing a longer "on time" pulse.
Figure 3:
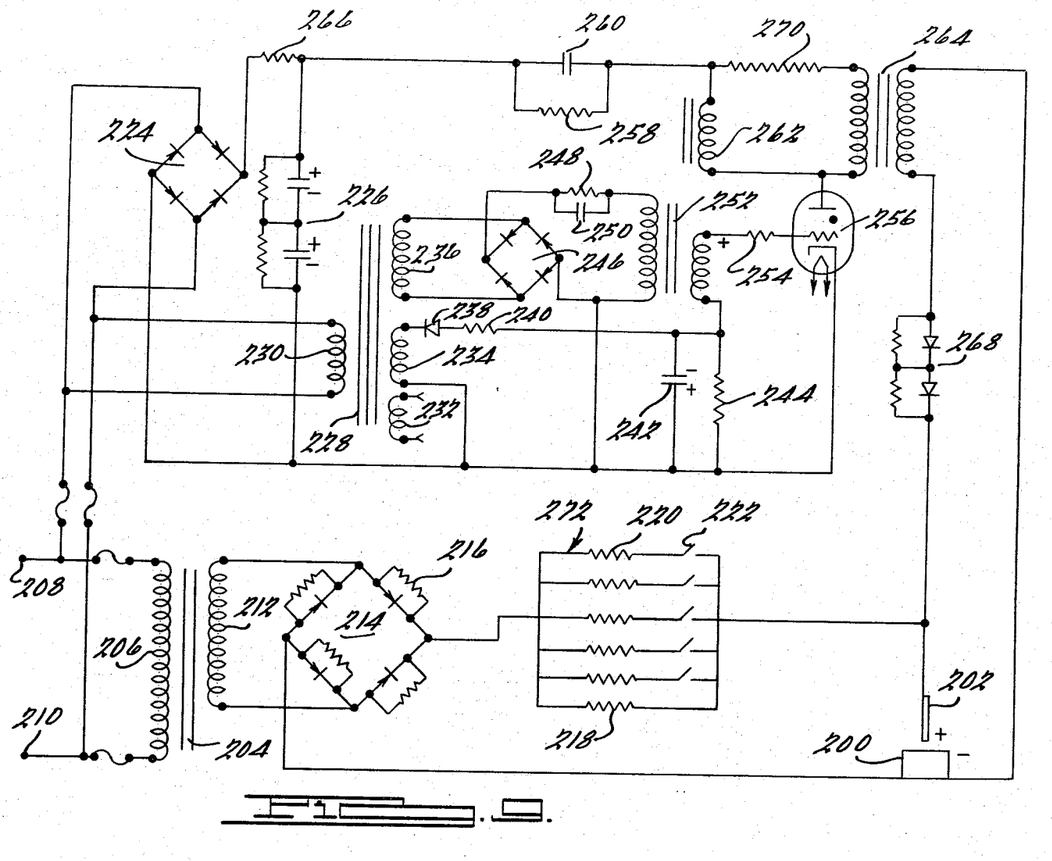

The output signal from driver tube 76 is developed from the voltage drop across variable resistor 90, which signal pulse with the added voltage of power source 82 constitutes the drive to the grids 92 of the bank 22. Proper adjustment of the circuit parameters will provide a signal at grids 92 having a selected on-time characteristic such as indicated in FIGS. 2 and 5, which illustrate graphically two somewhat extreme conditions.

As stated above, the signal generator power supply is the source 44. Resistors 94 and 96, the latter being shunted by a condenser 98, are provided as shown.

The primary 14 of transformer 16 has a damping network consisting of diode 100, resistor 102 and shunt capacitance 104 connected in shunt therewith.

The transformer 16 must be a stepdown transformer capable of handling relatively high currents at relatively high frequencies. The development of extremely thin iron lamination stock and specialized design now makes possible the design of transformers having the characteristics required for the circuit of FIG. 1. The transformer selected should have a maximum voltage swing on the primary equal to the peak voltage rating of the power tube selected and a turns ratio which will match the gap voltage required in EDM.

The aforementioned damping network limits the induced voltage or negative fly-back in the primary 14, which occurs between power pulses, to the voltage rating of the tubes 22 and this prolongs the lives of these tubes.

As so far described, it will be seen that the tube bank 22 normally is biased to non-conducting condition by voltage source 82. An amplified signal from the multivibrator will be impressed on the grids 92 of the power bank 22 and will overcome the normal grid bias and render the tube bank conductive. In accordance with the preselected adjustment of the circuit parameters, a voltage will occur across the primary 14 as graphically represented (for example) by FIG. 3, which will induce a voltage in the secondary 18 like that represented in FIG. 4. This secondary voltage is instantly effective across the gap between electrode 24 and workpiece 28, and a power pulse will be delivered across the gap eroding the workpiece. At the same instant, the full voltage of secondary 19 is applied to the gap in parallel with the pulse from winding 18. Once the gap is fired, the current buildup will, for all practical purposes, cut winding 19 out of the circuit because of the loading of the resistor 25. Substantially all of the power to the gap will be delivered by winding 18. The characteristic of winding 19 may be chosen to provide almost any desired striking voltage as this higher voltage is blocked from winding 18 by rectifier 26. This permits the latter winding to be designed for optimum power delivery to the gap. This sequence is repeated at high frequency until the machining operation is completed or the operation interrupted by the machine's power feed, as is known in the art.

The gap between electrode 24 and workpiece 28 is flooded with dielectric fluid during machining as is common in EDM.

The circuit of FIG. 1 includes a "watch-dog" which functions automatically to cut-off the power to the gap in event of a short circuit condition, which might damage the workpiece, or in event of malfunction of the apparatus, which might cause damage to the workpiece or to the components of the apparatus.

This "per pulse cut-off" comprises a pentode 106, the control grid 108 of which is connected through a resistor 110 to tap 112, which latter taps the keying resistor 90 at an intermediate point. The grid 108 normally is biased non-conducting by the shunt resistor and condenser network 114, 116, which is connected across the voltage source 82 through the screen voltage resistor 118 and the voltage reducing resistor 120. The voltage across resistor 90 plus that of the source 82 is, of course, the voltage which drives the grids 92 of the power tube bank 22. A selected portion of this voltage is thus effective on the grid 108 of cut-off tube 106 and tends to render tube 106 conductive whenever bank 22 is rendered conductive. The plate of tube 106 is connected to the grid circuit of multivibrator tube 38 by line 107 and conduction through tube 106 will instantaneously cut-off operation of the multivibrator.

However, the secondary of a transformer 122 (called for convenience the "cut-off transformer") is connected across the resistor 110 through a blocking diode 124. The primary of the transformer 122 is connected across the gap between electrode 24 and workpiece 28 through a limiting resistor 126.

If the apparatus is functioning normally, a drive signal on grids 92 of the bank 22 will result in a striking voltage appearing across secondary 18 of power transformer 16 and the gap will fire. This voltage would have to be only about 20 if there were no losses in the firing circuit. However, normal circuit losses require a voltage magnitude of 60 volts or more, and should a short circuit occur across the gap, the short circuit current would be almost 150% of normal. With narrow pulse operation, as graphically illustrated in FIG. 4, the peak current selected is usually the peak pulse rating of the individual tubes of the power tube bank, and a 150% overload of this pulse current would strip the tube cathodes with comparatively few pulses. Thus ordinary short circuit cut-off devices, such as thermally responsive devices, operate too slowly to provide protection.

My per-pulse cut-off device permits the power circuit to be operated with maximum efficiency because it renders it unnecessary to limit the power input to the gap to less than maximum desired on account of possibility of short circuits. The cut-off device operates to cut off the power input instantaneously, that is to say, in about 5% of the period of a power pulse, and thus provides complete safety to the apparatus. This cut-off device is extremely important in the operation of the machine especially when precision machining of expensive workpieces is being performed, when heat checking of the hole being cut might require scapping of the piece. The readiness of the device to function instantly is constantly maintained by the precise balancing of the circuit parameters. The connection of grid 108 to the keying resistor 90 tends to render tube 106 conductive each time the multivibrator pulses, but the dominating negative bias of the network 114–116 inhibits conduction of tube 106 in the absence of any keying signal. During normal operation, the keying pulse voltage developed across resistor 90 is exactly neutralized in the grid circuit of tube 106 by the action of circuit 122, 124, 110. However, appearance of a voltage across primary of transformer 122 (gap voltage) lower than a preset minimum will upset this voltage balance and instantaneously cause tube 106 to conduct and cut off the multivibrator through line 107. It is, of course, clear that the "leading edge" of the power pulse just initiated will cross the gap, but the cut-off is so fast that the power pulse will be literally squelched after initiation and no appreciable power will be delivered to the gap.

Interruption of operation of the multivibrator will, of course, cut off tube bank 22 as well as tube 106. After the normal pulse repetition delay time, the multivibrator will resume pulsing, and if the trouble in the gap which caused the abnormal low voltage has cleared, such as by back-up of the power feed, clearing of sludge, or the like, normal machine operation will be restored automatically.

It will be understood that the cut-off circuit shown is not limited to use with the particular power delivering circuit shown. It would be equally useful with other gap power circuits whether of the impedance matching type or not.

Reference is now made to FIGS. 2, 3 and 4, which show graphically voltage conditions in certain portions of the FIG. 1 circuit under one selected set of conditions. FIG. 2 shows the grid drive voltage on the grids of power tubes 22 when a signal of relatively short "on time" per cycle is received from the multivibrator. The point A of FIG. 2 represents the negative grid bias normally impressed on the grids 92. This negative voltage is effective on the grids for portions of the cycle represented by the lines AB and EF. The curve BCDE shows that the grid voltage is rendered positive by at least a sufficient amount to render the tube bank conductive for a period CD, the grids being made negative again, as indicated by DEFG for the remainder of the cycle. FIG. 3 shows that in response to the short pulse received from the power tube bank, a voltage AB is impressed on the primary of transformer 16 for a time BC. FIG. 4 shows the voltage pulse ABCD delivered to the gap between electrode 24 and workpiece 28, the negative flyback of the secondary winding DEFG being blocked from the gap by rectifier 26. There cannot be, therefore, any reverse polarity pulse across the gap.

FIGS. 5, 6 and 7 show a set of conditions similar, respectively, to FIGS. 2, 3 and 4, except that the primary voltage pulse triggered by the multivibrator is of relatively long duration.

In any event, for successful normal operation, the secondary voltage of correct polarity of fire the gap must be of sufficient magnitude to deliver on open circuit enough power to achieve a striking voltage at the gap of at least thirty volts and a sustained voltage in the order of twenty volts, taking into consideration the resistance and inductance of the secondary circuit which is, of course, always to be considered.

In this circuit, a striking voltage of extremely high magnitude can be had at relatively low level of power. After initial rupture, all EDM gaps break down to approximately 15 to 20 volts. Thus with the circuit being considered, it is possible to provide high striking voltage with the bulk of the machining power being delivered at low voltage but a high current. Thus, extremely good economy is achieved, both as regards electronic circuitry and power input.

For a more detailed consideration of the power pulse delivered by the secondary 18, reference is again made to FIG. 3. It is assumed that the transformer 16 has a 5 to 1 ratio, approximately 300 volts being impressed on the primary from the tube bank 22 and 60 volts being available across the secondary 18. The current amplified pulse is indicated by the rectangular wave curve ABCD, which pulse is of correct polarity and power phasing to deliver power to the gap. Flyback voltage DEFG is effectively blocked by rectifier 26 to prevent gap discharge of opposite polarity.

Figures 12, 14:
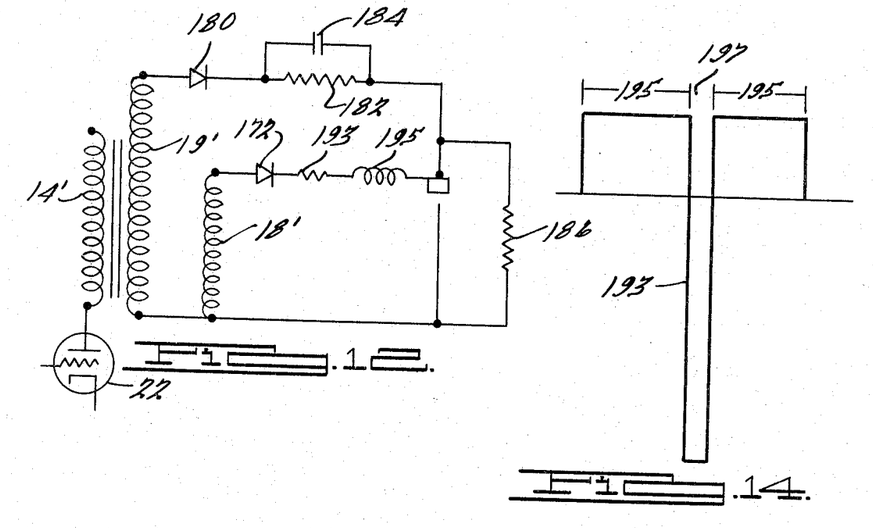
FIG. 12 is a modification of the FIG. 1 circuit in which a current limiting network is used.
FIG. 14 is a similar graph of the FIG. 8 circuit.

Reference is made to FIG. 12 which shows a modification of the circuit in which a resistor is connected across the machining gap, a condenser-limiting resistor network 182–184, is connected in series with a diode 180, to the high striking voltage winding 19'. This circuit provides for increased current flow from winding 19' during the initial portion or leading edge of a particular power pulse. Thus a relatively low impedance striking pulse is delivered which quickly ionizes the gap and forces conduction, the additional power from condenser 184 assisting.

In this circuit, the resistor 182 may be of relatively high value thus achieving increased efficiency during the machining portion of the cycle, since little power is drawn through the resistor 182 thereby allowing increased power to flow from the more efficient low voltage winding 18'. In addition, the average or RMS wave form impressed across the gap is substantially less and consequently the hazard to the operator and to the equipment is less.

Figure 13:
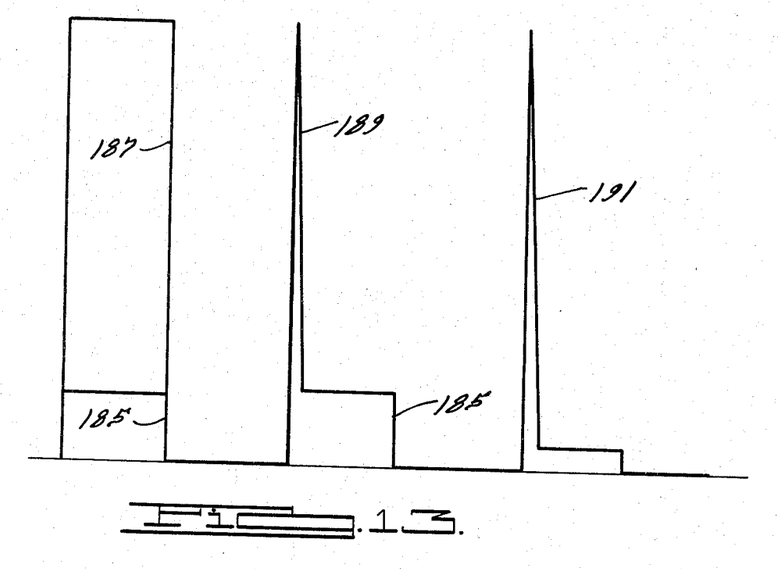
FIG. 13 is a graphical representation of the voltage wave form of the FIG. 12 circuit.

This may be better appreciated by analyzing the voltage wave forms shown in FIG. 13. Here, the open circuit voltage magnitude of winding 18', and of winding 18 (FIG. 1), is shown at 185. The open circuit voltage magnitude of winding 19 (FIG. 1) is shown at 187, this voltage being effective across the gap during the entire positive or in phase portion of the cycle. However, the open circuit gap voltage produced by network 186, 182, 184 (FIG. 12), is shown at 189. A high-magnitude spike occurs at the leading edge of the pulse for the duration of time determined by the network 182–184, and quickly falls to the value 185 of winding 18'.

The latter wave form has a much lower RMS value and therefore eliminates to a large extent the hazard of the high voltage during this condition of open circuit.

A typical cutting pulse is indicated at 191, during which the very high striking voltage at the leading edge of the pulse quickly drops to the typical 15–20 volt level of the EDM gap conduction voltage. The balance of the voltage of winding 18' is dissipated across resistance 193 and inductance 195 which represent the lumped losses inherent in the circuit.

The important factor in the operation of these circuits is the very high striking voltage which initiates each gap discharge and thus makes possible use of a wider gap which improves power feed stability and makes possible large overcut when such is required.

Figure 8:
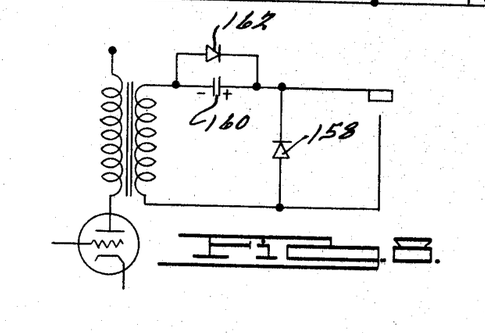
FIG. 8 shows a modification of the power supply circuit wherein a voltage doubler circuit connects the power source to the machining gap.

Referring now to FIGS. 8 and 14, it will be seen that I have applied the principle of the voltage doubler circuit to produce a high-voltage, low power striking voltage magnitude.

If, in a normal machining pulse cycle, as illustrated graphically in FIG. 14, the portion 195 is long compared to the off-time portion 197, the magnitude of the negative portion of the pulse will be substantially greater than the positive portion. This flyback voltage is stored across the relatively small condenser 160 (FIG. 8) which is connected across the gap through diode 158. The condenser 160 need be only of sufficient size to supply the power required to ionize the gap.

During the machining portion of the cycle, the component 195 is generated across the transformer and is in phase with conduction through the power tube bank. At this time, the voltage stored in condenser 160 is of proper polarity and is superimposed upon the machining pulse. Diode 158 blocks reverse discharge and this greatly increased voltage is effective across the gap. If the gap ionizes and conduction results, the condenser 160 is rapidly discharged through the transformer winding and gap and the bulk of the machining power flows through diode 162 in phase with pulse tube bank conduction.

This voltage doubler circuit is satisfactory as a superimposed striking voltage source where relatively small increase in magnitude of striking voltage is required, or where relatively long "ont time" occurs with respect to "off time" during a machining pulse cycle, as shown in FIG. 14.

It must be understood that the circuit shown in FIGURE 8 including the vacuum tube in the primary of the transformer is shown as a modification of the circuitry of FIGURE 1. Since one vacuum tube bank only is used, this circuit is known in the trade as "single ended" and as such is capable of delivering substantial power only in phase with vacuum tube conduction. If in this circuit condenser 160 becomes excessively large, the flyback voltage is excessively loaded causing an excessive component of DC flux in the core, thus destroying the pulse characteristics of the transformer.

It is found, however, that the load presented by condenser 160 may approach 10% of the total without destroying the pulse characteristics of the transformer.

This superimposed voltage of approximately 10% maximum power is, however, sufficient to ionize the gap and permit operation in accordance with the principles set forth herein.

If a source of AC is used in place of the vacuum tube and transformer or if a "double ended" or "push pull" transformer circuit is used, condenser 160 may be large and thereby utilize both portions of the AC wave form.

Reference is now made to FIG. 9 which shows a form of circuit particularly suitable for rouhening purposes. Here, single phase AC line voltage is used for input and the output to the gap is of low frequency, 60 cycles for example.

A stepdown transformer 204 has a primary winding 206 connected across line terminals 208, 210, and a secondary 212 across which is connected a full wave rectifier 214. The latter has balancing resistors 216 across each diode. The negative output of this rectifier is connected to the workpiece 200 in this instance, and the positive output is connected through resistor bank 272 to the machining electrode 202. The flow of gap current is controlled by the number of resistors 220 in the circuit, switches 222 being provided for controlling the bank. Note that resistor 218 is permanently connected, thus providing low loop impedance at all times. The output of this network is full wave rectified AC which presents to the gap 120 cycle pulsating DC power.

A trigger circuit for providing high striking voltage is associated with this low frequency supply. Connected directly to the single phase input lines 208, 210, is a full wave rectifier network 224 having in its output a current limiting resistor 266 and storage condensers 226. Also connected across the input line is a transformer 228 having a primary 230, and secondaries 232, 234, 236.

Secondary 232 supplies filament voltage to trigger thyratron 256. Winding 234, in conjunction with diode 238 and current limiting resistor 240, provides DC bias across condenser 242 and resistor 244 for maintaining thyratron 256 normally non-conductive.

Secondary 236 of transformer 228 is connected to full wave rectifier 246 which has in its output saturable transformer 252, series connected with a network consisting of resistor 248 in parallel with condenser 250. Transformer 252 is wound of oriented sharp knee iron such that it has a very sharp saturation characteristic and is provided with sufficient primary turns that it saturates readily during only a portion of the applied rectified AC voltage. After a brief portion of the pulsating DC voltage transformer 252 saturates and draws sufficient current to charge condenser 250 and maintain conduction through resistor 248. The resultant voltage generated across transformer 252 is a sharp spike of voltage occurring at the appropriate point in each cycle of the pulsating rectified line voltage. This sharp spike of voltage serves to trigger thyratron 256 since the secondary of transformer 252 is phased to cause conduction of thyratron 256. Thus, at a time near the beginning of each of the 120 pulses per second output, thyratron 256 is triggered into conduction. This triggering point occurs when the pulsating voltage output of rectifier 246 exceeds the residual voltage across condenser 250.

During a condition of open circuit, in which the gap between the electrode 202 and workpiece 200 is too great for conduction, a sharp high current surge is drawn through inductance 262 and a corresponding voltage is developed across transformer 264. In this open circuit condition, only the magnetizing current of transformer 264 flows through resistor 270. The time constant of choke 262 and condenser 260 is selected to produce a very brief interval for surge of current flow and a short duration pulse of voltage across transformer 264. As condenser 260 becomes charged to a voltage roughly equal to that stored across condenser network 226, the stored energy in the field of inductance 262 sustains conduction of thyratron 256 overcharging condenser 260. After collapse of the inductive energy in inductance 262, condenser 260 is overcharged to a voltage approximately twice that of condenser 226.

The resultant voltage at that instant around network 226, 256, 262, 260, is such that a negative voltage occurs on the plate of thyratron 256. This negative voltage in accordance with the characteristics of thyratron operation de-ionizes thyratron 256 and thus allows the grid of thyratron 256 to regain control, which at that instant is biased negative by condenser 242. Thus, a sharp pulse of voltage is applied across the working gap from the secondary of transformer 264 through diodes 268; and this sharp high voltage pulse occurs in-phase and corresponds to the power pulse from transformer 204 and the appropriate power network.

Should the gap ionize, and conduction result, current is drawn through diode 268 and secondary of transformer 264. This current flow is limited by resistor 270 series connected in the primary of transformer 264 to a value in accordance with the design. Should the working gap be shorted and result in no voltage across transformer 264, resistor 270 has sufficient resistance to allow choke 262 to function properly by overcharging condenser 260. Were it not for resistor 270, extremely high damaging currents would flow through thyratron 256 and no current would flow through choke 262 and in this instance, condenser 260 would not overcharge. Since a negative voltage would not be applied to the plate of thyratron 256 during this failure condition, DC conduction would result and the grid of thyratron 256 would have no control. Once DC conduction resulted, the machine would have to be shut off to allow the grid to regain control. Thus, the trigger pulses for high striking voltage pulses would disappear. For this reason, it is essential to achieve the proper balance between condenser 260, choke 262 and resistor 270. It is only necessary that resistor 258 be of such magnitude to limit the rate of discharge of condenser 260. Typical surge conditions through thyratron 256 would include a peak current of 300 amperes and an average or DC current of 5 amperes. Through use of storage condenser 226, greatly increased current flow results during the striking voltage pulse for short duration than would otherwise be possible. In this manner, power economy is achieved since the striking voltage pulse lasts for a very brief portion of each cycle and the bulk of the machining power is delivered through transformer 204 at a low voltage level, just high enough to sustain conduction of the desired magnitude through resistor network 272 and to limit current flow through the working gap on short circuit, since it is readily apparent that no short circuit control exists. This circuit has one outstanding advantage not possible in any of the other forms of superimposed high striking voltage and that is through the use of thyratron 256 and the triggering network, not only very high voltage may be generated but also high current during the brief interval of the striking voltage pulse. This high power pulse helps maintain the gap even at an increased distance since it disintegrates any medium impedance stringers or short circuits that may tend to bridge the working gap and observation of its performance indicates somewhat better reliability than the other high voltage, high impedance triggering circuits. This particular circuit is limited to twice the frequency of the input AC voltage and also to the relatively low frequency of operation for the thyratron which under no circumstances could exceed 1000 cycles per second for most commercially available xenon filled thyratrons.

It must be noted that the AC voltage developed across secondary 212 of transformer 204 is of relatively low magnitude compared to the triggering voltage developed from the thyratron circuit. Full wave rectifier assembly 214 must be of sufficient voltage rating to block or withstand the inverse voltage developed from the triggering pulse. In other words, this voltage is applied and divided across balancing resistors 216 such that approximately half the voltage of the triggering voltage occurs across each resistor and in this manner the power from the superimposed circuit is blocked from secondary 212 of the power transformer by this high voltage rectifier network in a manner very similar to the circuitry of FIG. 1. The triggering pulse must be phased by the choice of resistor 248, condenser 250 to occur sometime after the rectified sinusoidal voltage output of rectifier 214 is high enough to sustain conduction through the arc.

Figure 10:
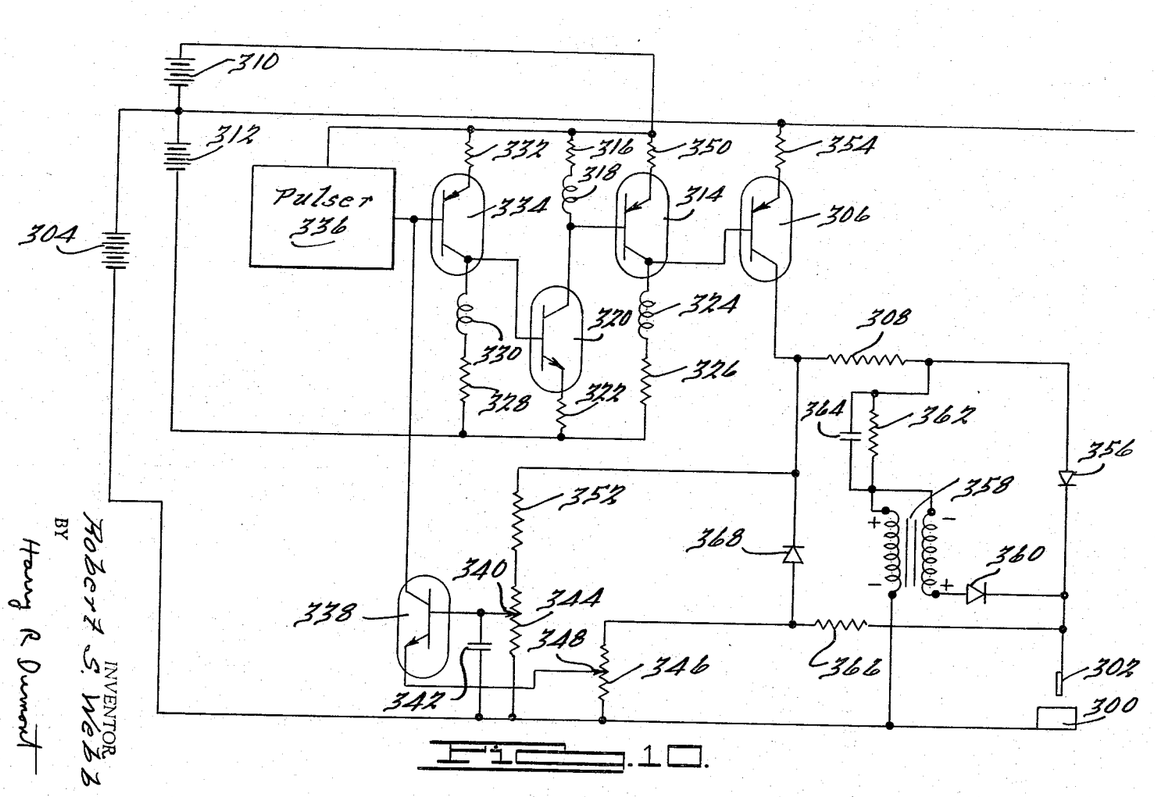
FIG. 10 is a modification of the circuit utilizing transistors instead of electron tubes.

Attention is now directed to FIG. 10, which is a circuit employing transistors for higher frequency operation and a novel network for achieving the superimposed high striking voltage. The novel network for achieving the superimposed high striking voltage comprises a step-up transformer 358 and associated components about to be described.

FIGURE 10 is a circuit embodying transistors for the control of the pulsating arc power as well as in the pre-amplifier. It is essential to realize that in this instance, rectangular pulses are also generated in a manner very similar to the circuitry of FIGURE 1. In the transistor circuitry of FIG. 10, the working gap consisting of electrode 302 and workpiece 300 is connected through dropping resistor 308, to the collector of transistor 306. The emitter of transistor 306 is connected to the positive terminal of the EDM DC power supply 304. The pulser amplifier for output transistor bank 306 is similar at least in principle to the circuitry of FIGURE 1. Transistor 306 is generally many transistors, perhaps hundreds of transistors capable of generating the very high output machining currents required in EDM. PNP transistor 314 may represent a bank of transistors for the pre-amplifier in a manner analogous to that of the tube bank 76 in the circuitry of FIGURE 1. In this circuitry, transistor driver bank 314 is nonconductive during conduction of transistor 306. PNP type transistor 306 is rendered conductive by DC power supply 312 through resistor 326 and choke 324. Conduction of transistor driver bank 314 connects the base of power bank 306 and shunts the current flow from resistor 326 and choke 324, such that the direction of electron flow in this instance is from drive voltage 312 through resistor 326, choke 324, collector-emitter of transistor 314 and back to the positive terminal of voltage 310.

Drive current during ON time of transistor 306 is furnished from battery 312 through resistor 326, choke 324 and the base emitter circuit of transistor 306 back to the positive terminal of voltage 312. Choke 324 as well as choke 318 and 330 are included to provide sharp leading edge drive of the appropriate transistor network. During a period of conduction of transistor 314, increased electron flow is drawn through resistor 326 and choke 324 in accordance with the higher total voltage of bias 310 and drive voltage 312. As transistor 314 shuts off instantaneously, this increased electron flow is forced or accelerated through the base emitter circuit of transistor 306, thus providing sharp leading edge drive in an accelerated manner for the duration of the inductive effect of choke 324. In a similar manner, as transistor 314 becomes instantaneously conductive, the increase in electron flow through choke 324 is momentarily retarded and provides for a sharp cut-off pulse to transistor 306, thus assuring vertical rise and fall and sharp switching action of each particular transistor stage. Similarly, NPN transistor 320 drives transistor 314 drawing electron flow from drive supply 312 through bias resistor 322, emitter collector of transistor 320 and base emitter circuit of transistor 314. Electron flow is momentarily retarded through choke 318 thus providing a sharp surge to transistor 314 for turn ON through base emitter circuit of transistor 314 and bias resistor 350. During conduction, a shunt electron flow also occurs through choke 318 and resistor 316. As transistor 320 is switched OFF sharply, choke 318 sustains electron flow in the same direction and sharply cuts off transistor 314 causing cut-off electron flow through resistor 316, resistor 350 and clearing the emitter base circuit of transistor 314.

NPN transistor 320 is likewise rendered conductive by the first drive transistor shown in this amplifier as transistor 334. Thus electron flow for drive of transistor 320 occurs from the negative terminal of supply 312 through limiting resistor 322, emitter base circuit of transistor 320, collector-emitter of transistor 334, resistor 332, bias supply 310, to the positive terminal of drive voltage 312. After a short delay determined by inductance 330, a shunt electron flow is also drawn through resistor 328 and inductance 330 in parallel with network 322, 320. As transistor 334 shuts off sharply, choke 330 sustains a cut-off electron flow through base-emitter of transistor 320, resistor 322, resistor 328, thereby clearing and sharply cutting off transistor 320.

The pulser drive shown in this instance as pulser 336 may be a tube type of pulser or multivibrator as shown in FIG. 1, or it may be a commercially available pulser of suitable characteristics, or it may be a transistor multivibrator designed for particular control of the circuitry.

In a manner very similar to that of FIG. 1, transistor 338 operates as a per-pulse cut-off device in the circuitry of FIG. 10. It must be noted, in this instance, that when transistor 334 is rendered conductive, output transistor bank 306 is rendered nonconductive. The machining pulse in FIG. 10 occurs when transistor 306 is conductive and is interrupted during normal operation by the conduction of pulser 336 at selected time intervals through the base-emitter circuit of transistor 334.

Prior to the start of a machining pulse, pulser 336, transistor 334, transistor 314, are all conductive, biasing power transistor bank 306 OFF. In this condition, transistor 338 is also biased OFF by the absence of any drive signal in its base circuit and by virtue of the direct resistance connection from the base of transistor 338 through potentiometer arm 340 and the lower leg of potentiometer 344 through the lower portion of potentiometer 346 to the emitter of transistor 338. Since no voltage exists in this loop, cut-off transistor 338 is nonconductive. At the initiation of a machining power pulse, pulser 336 becomes sharply nonconductive, rendering transistor 334 and transistor 314 nonconductive, thus permitting conduction of power transistor 306. If the space between electrode 302 and workpiece 300 is sufficient to permit voltage across the working gap, this voltage is also presented across potentiometer 346 and a portion of this voltage is presented at tap 348. After a momentary delay interval determined by the relative magnitude of condenser 342, the upper portion of potentiometer 344 and resistor 352, a keying signal occurs at potentiometer arm 340. The per-pulse cut-off operation, in this instance, compares the relative magnitude between the portion of the arc voltage at 348 and the keying signal at 340. If the arc voltage is of a sufficient magnitude to overcome the voltage at tap 340, transistor 338 is maintained in a nonconducting condition and thus does not affect the operation of the power circuitry. If the voltage at tap 348 is less than that of keying reference 340, transistor 338 becomes instantaneously conductive with drive electron flow in this instance occurring from the negative terminal of power voltage 304 through the lower portion of potentiometer 346, potentiometer arm 348, emitter-base of transistor 338, the upper portion of potentiometer 344 and resistor 352, collector-emitter of transistor 306, balancing resistor 354 to the positive terminal of power voltage 304, thus rendering transistor 338 conductive. This condition of conduction corresponds exactly to the performance of the other circuits in which a voltage lower than the pre-set magnitude occurring across the arc will instantaneously render the cut-off device active. In this instance, conduction of transistor 338 drives transistor 334 in such a manner as to interrupt conduction of transistor 306, thus instantaneously squelching the faulty pulse in the output.

In a manner similar to that of the previous circuits, transistor 338 may be so connected to directly affect the operation of the pulser by triggering the multivibrator portion of that pulser. In the circuitry shown in FIG. 10, however, cut-off transistor 338 overcomes the action of pulser 336 and operates independently of the pulser to shut off the faulty cutting power. Performance of the circuitry in this manner has the one advantage that after the very short delay time encountered in the transistor components and the various stages of the amplifier, it is possible to re-ignite the arc immediately without waiting for the normal interval between pulses caused by pulser 336. Of course, no pulse of duration longer than that determined by pulser 336 is permitted and the action of the cut-off transistor 38 in this instance is only to cut-off the faulty portion of any particular pulse.

The gap between electrode 302 and workpiece 300 is fed through transistor 306 which represents a bank of transistors the number of which will be dictated by the power requirements of the machine.

It may be seen from FIG. 10 that transformer 358 is connected to power voltage 304 through condenser 364, resistor 308 and power transistor bank 306 and limiting resistor 354. The secondary of transformer 358 is wound and phased such that a voltage boost is achieved from the fundamental machining power voltage 304 of the desired increase generated on the secondary of transformer 358. Diode 360 connected to the output side of the secondary of transformer 358 blocks reverse conduction through transformer 358. In a manner similar to the triggering of transformer 252 shown in FIG. 9, transformer 358 saturates sharply after the initial pulse of voltage occurs for triggering and the resultant output wave form would be identical to that of 189 of FIG. 13. Diode 356 blocks the superimposed high striking voltage from resistor 308 and transistor bank 306. In addition, during the superimposed high striking voltage, rectifier 368 becomes conductive through resistor 366 to clip the superimposed spike of voltage from rheostat 346.

Should the electrode spacing be sufficient to ionize the gap, sufficient current is drawn through transformer 358 to charge condenser 364 such that no additional current flow occurs beyond the initial leading triggering spike. The charging time of condenser 364 is short with respect to the total pulse duration so that only a small amount of power is lost through the less efficient high voltage circuitry. The time constant of condenser 364, resistor 362, is of the order of time of the OFF time between pulses, such that condenser 364 discharges substantially between cycles.

From this analysis, it becomes apparent that the common denominator of all superimposed high voltage circuits consists of the provision for the high striking voltage and a blocking diode of a voltage rating sufficient to block this high striking voltage and a current rating sufficient to carry full machining current. In the circuitry of FIG. 10, this diode is 356; in circuitry of FIG. 9, the diode is 214; and so on for each specific instance.

Figure 11:
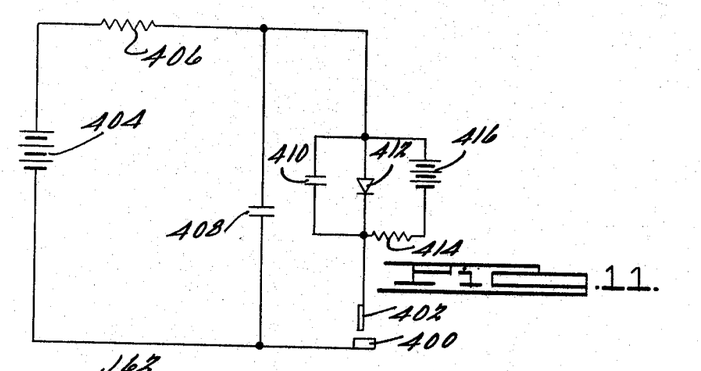
FIG. 11 is a further modification showing the superimposed high striking voltage principle applied to a relaxation oscillator circuit.

An additional form of circuitry embodying superimposed high striking voltage is an RC type of circuit or relaxation oscillator circuit, embodying the same principle of operation. An example of this type of circuit is shown in FIGURE 11. In the superimposed high striking voltage RC circuit shown in FIG. 11, DC supply voltage 404, resistor 406 and condenser 408 form the fundamental high current RC circuit for electrode 402 and workpiece 400. Resistor 406 and condenser 408 would be selected in accordance with normal design procedures for RC circuitry.

The superimposed high voltage portion is obtained from high DC supply voltage 416, resistor 414 and condenser 410. It may be seen that upon initiation of any charging cycle, condenser 408 is charged through resistor 406 by supply voltage 404 and superimposed condenser 410 is charged through resistor 414 by supply voltage 416. During the charging cycle, diode 412 blocks conduction from supply voltage 416. The total voltage impressed across the working gap is therefore the voltage stored across condenser 408 added to the superimposed voltage stored across condenser 410. Should the gap distance be short enough, such that a discharge results, condenser 410 is rapidly discharged through the machining gap and the balance of the current from condenser 408 discharges through the machining gap and through diode 412, thus completing one complete discharge cycle of this relaxation oscillator form of operation. As in each case with the superimposed circuitry, tremendous economy occurs, since battery 404 need only be high enough voltage to sustain the arc in accordance with normal principles of design of an RC type of circuit, and battery 416, which is the superimposed high striking voltage, need have only sufficient power to ionize the arc at the high voltage level since the bulk of machining power is supplied by DC power source 404. A circuit of this type is virtually mandatory where the benefits of high striking voltage are to be achieved with an RC power supply, since for any substantial machining power, extreme limit would be placed not only on the input power supply 404 but on the power dissipating capacities of resistor 406. Typical machining currents are in excess of 100 amperes and a superimposed high striking voltage in excess of 300 volts which would result in 30 kilowatts of wasted power in resistor 406. The size and cost of such a resistor suitable for an RC type EDM circuit would be prohibitive but would become entirely practical when this method of superimposed circuitry is employed. It is essential for proper operation of this circuit that the charging time constant of 408–406 be less than the time constant of 410–414 so that "triggering" occurs only when condenser 408 is substantially charged.

It will be understood from the above that the provision of a superimposed high striking voltage in connection with the regular gap voltage in EDM apparatus results, among other advantages, in greater stability of power feed operation because it permits the use of a wider gap. By making the gap spacing respond to the higher striking voltage rather than the lower machining voltage, the wider gap is maintained yet this wider gap is readily ionized without high expenditure of power and the finish and accuracy of cut are not impaired.

In the foregoing examples, the means for passing power pulses across the gap is shown as either a bank of vacuum tubes or a bank of transistors. This "electronic switch" may be any device having a circuit-controlling or gating ability by virtue of which a pulsating signal of relatively small magnitude is capable of "triggering" the switch at high frequency without the use of mechanical devices such as relays.

I claim as my invention:

1. In an apparatus for machining a conductive workpiece by electrical discharges across a dielectric coolant filled gap between an electrode tool and the workpiece, comprising a power supply, a periodically operated electronic switch having a pair of principal electrodes, said electronic switch having its principal electrodes connected in series with a diode and said gap across said power supply for providing machining power pulses to said gap, and a transformer of the step-up type, said transformer having its primary winding operatively connected across the series combination of said diode and said gap, said transformer having its secondary winding connected in series with a diode across said first mentioned diode for impressing a higher voltage pulse on each of the aforesaid machining power pulses.

2. The combination as set forth in claim 1 wherein a means is operatively connected to said transformer primary winding for limiting power flow therethrough to a relatively short time duration.

3. In an apparatus for machining a conductive workpiece by electrical discharges across a dielectric coolant filled gap between an electrode tool and the workpiece, comprising a power supply, a transistor having a control electrode and a pair of power electrodes, means operatively connected to said control electrode for rendering said transistor alternately conductive and nonconductive, said principal electrodes connected in series with a diode and said gap across said power supply for providing machining power pulses to said gap, and a transformer of the step-up type, said transformer having its primary winding connected in series with a parallel RC network across said gap for limiting the power flow therethrough, said transformer having its secondary connected in series with a diode across said first-mentioned diode for impressing a higher voltage pulse on each of the aforesaid machining power pulses.

4. In an apparatus for machining a conductive workpiece by electrical discharges across a dielectric coolant filled gap between an electrode tool and the workpiece, comprising a power supply, a transistor having a control electrode and a pair of power electrodes, means operatively connected to said control electrode for rendering said transistor alternately conductive and nonconductive, said principal electrodes connected in series with a diode and said gap across said power supply for providing machining power pulses to said gap with predetermined on-time and off-time, and a transformer for the step-up type, said transformer having its primary winding connected in series with a parallel RC network across said gap, said RC network having a time constant substantially of the order of pulse off-time, said transformer having its secondary connected in series with a diode across said first-mentioned diode for impressing a higher voltage pulse of like polarity of each of the aforesaid machining power pulses.

References Cited

UNITED STATES PATENTS

| | | | |
|---|---|---|---|
| 2,871,410 | 1/1959 | Matulaitis | 315—120 |
| 2,951,969 | 9/1960 | Matulaitis | 315—163 |
| 3,052,817 | 9/1962 | Branker | 315—171 |

DAVID J. GALVIN, *Primary Examiner.*